United States Patent [19]

Johnson et al.

[11] Patent Number: 4,472,529
[45] Date of Patent: Sep. 18, 1984

[54] HYDROCARBON CONVERSION CATALYST AND USE THEREOF

[75] Inventors: Russell W. Johnson, Villa Park; Mark J. O'Hara; Hillard L. Kuntz, both of Mt. Prospect, all of Ill.

[73] Assignee: UOP Inc., Des Plaines, Ill.

[21] Appl. No.: 458,674

[22] Filed: Jan. 17, 1983

[51] Int. Cl.³ .................. B01J 21/02; B01J 35/00
[52] U.S. Cl. ...................... 502/228; 502/229; 502/231
[58] Field of Search .......... 502/74, 228, 229, 257, 502/231

[56] References Cited

U.S. PATENT DOCUMENTS

| | | | |
|---|---|---|---|
| 3,575,887 | 4/1971 | Wilson | 208/111 X |
| 3,591,487 | 7/1971 | Schutt | 208/111 X |
| 3,619,412 | 11/1971 | Clement et al. | 208/111 |
| 3,673,108 | 6/1972 | Schutt | 208/111 X |
| 3,692,697 | 9/1972 | Kravitz et al. | 208/111 X |
| 3,725,244 | 4/1973 | Schutt | 208/111 X |
| 3,795,606 | 3/1974 | Jaffe | 208/111 |
| 3,804,778 | 4/1974 | Ramanadin | 502/228 |
| 3,818,151 | 4/1974 | Yamazi et al. | 208/111 X |
| 3,835,026 | 9/1974 | Takase et al. | 208/111 |
| 3,852,372 | 12/1974 | Suggitt et al. | 208/111 |
| 3,939,059 | 2/1976 | Autos | 502/228 |
| 3,963,601 | 6/1976 | Hilfman | 208/111 |
| 4,130,505 | 12/1978 | Nasser, Jr. et al. | 502/228 |
| 4,139,492 | 2/1979 | Polaro et al. | 502/228 |
| 4,175,033 | 11/1979 | Hilfman | 502/228 |
| 4,285,807 | 8/1981 | Stanulonis et al. | 502/228 |

Primary Examiner—Delbert E. Gantz
Assistant Examiner—Lance Johnson
Attorney, Agent, or Firm—James R. Hoatson, Jr.; John G. Cutts, Jr.; William H. Page II

[57] ABSTRACT

A hydrocarbon conversion catalyst is disclosed which catalyst comprises a refractory inorganic oxide, a Group VIB metal component, a Group VIII metal component and a fluoride component wherein the last step in the catalyst preparation is the incorporation of the fluorine component and a subsequent calcination in contact with a flowing gas. Other embodiments of the present invention describe the use of the catalyst for hydrocarbon conversion and preferred methods of catalyst manufacture.

6 Claims, No Drawings

HYDROCARBON CONVERSION CATALYST AND USE THEREOF

BACKGROUND OF THE INVENTION

1. Field of the Invention

The field of art to which this invention pertains is the catalytic conversion of hydrocarbons. This invention also relates to hydrocarbon conversion catalysts and their methods of manufacture. The catalyst composite of the present invention demonstrates unexpected and exceptional activity, selectivity and resistance to deactivation when employed in a hydrocarbon conversion process. More particularly, the invention relates to a catalyst which is useful for performing the hydrocracking of hydrocarbons.

2. Description of the Prior Art

The hydrocracking of hydrocarbons by catalytic means is old and well known in the prior art. Hydrocracking of hydrocarbon oil, which may be high-boiling fractions, such as for example reduced crudes, gas as oils, topped crudes, shale oil, coal extract, and tar sand extract, generally is performed at relatively high temperatures and pressures of the order of 500° F. and 500 psig and upward. Catalysts for the hydrocracking of hydrocarbons are generally moderate to strong hydrogenation catalysts.

The prior art hydrocracking catalysts will typically comprise one or more components selected from silica, alumina, silica-alumina, crystalline aluminosilicate, or other refractory inorganic oxides and at least one metal component from Group VIB or Group VIII. Hydrocracking catalysts containing alumina and crystalline alumino-silicate or alumina and silica have been shown to be particularly effective in the hydrocarbon hydrocracking process. One or more hydrogenation components have been selected by the prior art to serve as the hydrogenation component in hydrocarbon conversion catalysts. The prior art has broadly taught that hydrogenation components may be selected from at least the following metals: iron, cobalt, nickel, ruthenium, rhodium, palladium, osmium, iridium, platinum, chromium, molybdenum, tungsten, vanadium, niobium, and tantalum.

In U.S. Pat. No. 3,963,601 (Hilfman), a hydrocarbon conversion catalyst is disclosed which catalyst comprises an alumina-silica support, a Group VIB metal component, a Group VIII metal component and a fluoride component. Additionally, the Hilfman patent discloses and teaches that the final catalyst composite is dried at a temperature from about 200° F. to about 600° F. for a period from about 2 to about 24 hours and finally calcined at a temperature of about 700° F. to about 1100° F. for a period of about 0.5 to about 10 hours.

It is generally recognized that catalysis is a mechanism particularly noted for its unpredictable nature. Minor variations in a method of manufacture often result in an unexpected improvement in the catalyst product with respect to a given hydrocarbon conversion reaction. The improvement may be the result of an undetermined alteration in the physical character and/or composition of the catalyst product difficult to define and apparent only as a result of the unexpected improvement in the catalyst activity, selectivity and/or stability.

One of the discoveries of the present invention is a novel catalyst which exhibits improved and unexpected hydrocarbon conversion characteristics, such as for example activity, selectively and extraordinary stability. The present invention also describes the utilization of the novel catalyst in a hydrocarbon conversion process. Another embodiment of the present invention describes methods for preparing catalysts.

SUMMARY OF THE INVENTION

Accordingly, the invention is, in one embodiment, a catalytic composite comprising a refractory inorganic oxide, a Group VIB metal component, a Group VIII metal component and a fluoride component wherein the last step in the catalyst preparation is the incorporation of the fluorine component and a subsequent calcination in contact with a flowing gas.

In a second embodiment, the invention is a process for the conversion of a hydrocarbon charge stock which comprises contacting a hydrocarbon with a catalytic composite comprising a refractory inorganic oxide, a Group VIB metal component, a Group VIII metal component and a fluoride component wherein the last step in the catalyst preparation is the incorporation of the fluorine component and a subsequent calcination in contact with a flowing gas.

In a third embodiment, the invention is a method for the preparation of a catalytic composite comprising a refractory inorganic oxide, a Group VIB metal component, a Group VIII metal component and a fluoride component wherein the last step in the catalyst preparation is the incorporation of the fluorine component and a subsequent calcination in contact with a flowing gas.

Other embodiments of the present invention encompass further details such as specific component concentrations of the catalytic composite, methods of preparation, preferred feedstocks and hydrocarbon conversion conditions, all of which are hereinafter disclosed in the following discussion of each of these facets of the invention.

DETAILED DESCRIPTION OF THE INVENTION

The hydrocarbon charge stock subject to hydroconversion in accordance with the process of this invention is suitably a petroleum fraction boiling in the range from about 200° F. to about 1200° F. Pursuant to the present process, the hydrocarbon charge stock is reacted with hydrogen at hydroconversion conditions which may include a pressure from about 500 psig to about 3000 psig and a temperature from about 500° F. to about 900° F.

Petroleum hydrocarbon fractions which can be utilized as charge stocks thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The hydrocarbon charge stock may boil substantially continuously between about 200° F. to about 1200° F.

or it may consist of any one, or a number of petroleum hydrocarbon fractions, such as are set out above, which distill over within the 200°–1200° F. range. Suitable hydrocarbon feedstocks also include hydrocarbons derived from tar sand, oil shale and coal.

Since the petroleum hydrocarbons and other hydrocarbons as well which may be hydroprocessed according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures from about 500° F. to about 1000° F. are generally operable. However, where the particular petroleum hydrocarbon fraction utilized boils within the range from about 700° F. to about 900° F., it is preferred to operate at reaction temperatures in the more restricted range from about 500° F. to about 800° F. Hydrocarbon conversion processes which are contemplated for the present invention may include for example desulfurization, denitrification, hydrogenation, hydrocracking, etc.

Pursuant to the present invention and as hereinabove mentioned, hydrogen may be reacted with the hydrocarbon charge stock preferably at a pressure from about 500 psig to about 3000 psig. The hydrogen circulation rate is preferably from about 500 standard cubic feet to about 20,000 standard cubic feet per barrel of charge stock, although amounts of from about 200 standard cubic feet to as much as 30,000 standard cubic feet per barrel are operable. The liquid hourly space velocity of the hydrocarbon charge stock is preferably from about 0.2 to about 10 depending on the particular charge employed and the reaction temperatures necessitated thereby. A suitable correlation between space velocity and reaction temperature can be readily determined by one skilled in the art in any particular instance. When utilizing a charge stock boiling in the range of from about 700° to about 900° F., a liquid hourly space velocity of from about 1 to about 3 is preferred.

The catalyst composite of the present invention comprises a refractory inorganic oxide. Such refractory inorganic oxides which are contemplated for the present invention include crystalline alumino-silicate zeolites, such as mordenite, and faujasite-alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia.

Regardless of which refractory inorganic oxide is selected, it must be resistant to the temperature and other conditions employed during the use of the catalyst composite. Such refractory inorganic oxide matrix material may also include synthetic or naturally occurring substances as well as clays, silica and/or metal oxides. The latter may be either naturally occurring or in the form of gelatinous precipitates or gels including mixtures of silica and metal oxides. Naturally occurring clays which may be utilized include those of the montmorillonite and kaolin families, which families include the sub-bentonites and the kaolins commonly known as Dixie, McNamee-Georgia and Florida clays or others in which the main mineral constituted is halloysite, kaolinite, dickite, nacrite or anauxite. Such clays can be used in the raw state as originally mined or initially subjected to calcination, acid treatment or chemical modification.

The refractory inorganic oxide can be formed in any desired shape or type of catalyst known to those skilled in the art such as rods, pills, pellets, tablets, granules, extrudates, spheres and the like forms. While any suitable refractory inorganic oxide may be utilized in our invention, the results may not necessarily be equivalent.

A preferred refractory inorganic oxide comprises silica and alumina. The alumina may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. The alumina may be composited with the silica in any convenient method known in the prior art or otherwise. For example, one method for preparing the refractory inorganic oxide is by admixing finely divided alumina with finely divided silica and forming a desired shape such as rods, pills, tablets, granules, extrudate and the like forms. Another method, for example, for preparing the refractory inorganic oxide is by mixing finely divided alumina into an aqueous colloidal dispersion of silica particles and drying and calcining the resulting admixture. Such aqueous colloidal dispersions of silica particles are commercially available on a large scale from the E. I. duPont deNemours & Co. under the tradename Ludox Colloidal Silica, the Nalco Chemical Co. under the tradename Nalcoag and others. In the event aqueous colloidal silica is selected as a precursor, it is preferred that the sodium level be minimized for best results. Yet another method for preparing the refractory inorganic oxide is by mixing finely divided silica into an alumina sol, gelling the sol by addition of dilute ammonia to produce a gel which is then dried and pelleted. Spherical catalyst particles can be formed, for example, by dropping the admixture of finely divided silica and alumina sol together with a gelling agent into a hot oil bath to form spherical particles of an alumina gel containing silica.

Other essential ingredients are a Group VIB metal component and a Group VIII metal component. Thus, the catalytic composite of the present invention may contain metallic components from the group of molybdenum, tungsten, chromium, iron, cobalt, nickel, platinum, palladium, iridium, osmium, rhodium, ruthenium and mixtures thereof. The concentration of the catalytically active metallic components is primarily dependent upon the particuular metals as well as the physical and chemical characteristics of the charge stock. For example, the metallic components from Group VIB are preferably present in an amount within the range from about 0.01 percent to about 20 percent by weight, the iron-group metals in an amount within the range of from about 0.01 percent to about 10 percent by weight, whereas the platinum-group metals are preferred to be present in an amount within the range of from about 0.01 percent to about 5 percent by weight, all of which are calculated as if the metallic component existed within the finished catalytic composite as the elemental metal. Preferred Group VIB metal components include molybdenum, tungsten, and compounds thereof. Preferred Group VIII metal components include cobalt, nickel and compounds thereof.

After the refractory inorganic oxide is composited, the composite is preferably dried at a temperature from about 200° F. to about 600° F. for a period from about 1 to about 24 hours or more and finally calcined at a temperature from about 700° F. to about 1400° F. for a period from about 0.5 to about 10 hours. The calcined refractory inorganic oxide may be combined with the catalytically active metallic components in any suitable manner such as ion-exchange and/or impregnation with a suitable solution of the metallic components. Accordingly, the preferred method of preparing a catalyst comprising a metallic component with the hereinabove described carrier or support involves the utilization of water soluble compounds of the metallic component to impregnate the calcined support material.

Regardless of the details of how the metallic component of the catalyst is combined with the refractory inorganic oxide support, the resulting combination generally will be dried at a temperature from about 200° F. to about 600° F. for a period from about 2 to 24 hours or more and finally calcined at a temperature from about 700° F. to about 1400° F. for a period of about 0.5 to about 10 hours, and preferably 1 to about 5 hours.

Another essential component of the catalyst of the present invention is a fluoride component. Although the precise form of the chemistry of association of the fluoride with the refractory inorganic oxide support is not entirely known, it is customary in the art to refer to the fluoride as being combined with the support and/or the other ingredients of the catalyst. Although any technique for the actual incorporation of the fluoride or fluorine component may be used in the present invention, it is preferred that the fluoride component is introduced onto the composite after the Group VIII and Group VIB metal components have been deposited on the refractory inorganic oxide support. The fluoride component may be incorporated, for example, by contacting the composite with an aqueous hydrofluoric acid solution, an aqueous ammonium bifluoride (NH$_4$HF$_2$) solution, etc. Once the fluoride is incorporated with the composite, the catalyst is dried and calcined. However, we have discovered that the calcination of the catalytic composite containing the incorporated fluoride component must be conducted in accordance with the present invention as described hereinafter to achieve the preparation of a novel, extraordinary hydrocarbon conversion catalyst. The calcination of the catalytic composite containing the newly incorporated fluoride component must be conducted in contact with a flowing gas. It is preferred that this flowing gas has a gas hourly space velocity of greater than about 150. The flowing gas as may be any convenient gas such as, for example, nitrogen or air. The presence of added steam during the calcination is deleterious and must be avoided. Nitrogen is a preferred gas for purposes of the present invention. The gas flow rate is described and quantified by the expression "gas hourly space velocity" which is defined as the volume of the flowing gas per hour at calcination temperature for each unit volume of catalyst. Once the fluoride is incorporated with the composite, the catalytic composite is first dried at a temperature from about 200° F. to about 600° F. for a period from about 2 to about 24 hours or more and finally calcined in the presence of the flowing gas at a temperature from about 700° F. to about 1400° F. for a period of about 0.5 to about 10 hours. The criticality of the gas flow rate is demonstrated hereinafter in the Example. Without wishing to be bound by a theory, it is believed that the flow of a purge gas during the calcination of the newly incorporated fluoride component greatly reduces the partial pressure effect of water which is expelled during calcination in the immediate vicinity of the catalyst, thereby producing a novel and extraordinary catalyst. It is further believed that this resulting reduced partial pressure of water during calcination promotes a favorable interaction of the metal moieties, the inorganic oxide and the fluoride component with each other and contributes to the superior performance of the finished catalyst composite. The prior art, in U.S. Pat. No. 3,963,601 (Hilfman), teaches the incorporation of a fluoride component in a hydrocarbon conversion catalyst and the subsequent drying and calcining. The Hilfman patent is silent about any teaching pertaining to the fluoride component calcination in the presence of flowing gas and has therefore failed to recognize the benefits to be afforded therefrom. Unlike the prior art, and in accordance with the present invention, the calcination of the fluoride component is conducted in the presence of a critical amount of a flowing gas.

It is preferred that the resultant calcined catalytic composite be subjected to reduction conditions prior to its use in the conversion of hydrocarbons. Preferably, substantially pure and dry hydrogen is used as the reducing agent in this step. The reducing agent is contacted with the calcined catalyst at a temperature of about 800° F. to about 1400° F. and for a period of time of about 0.5 to about 10 hours or more.

Although it is not essential, the resulting reduced catalyst is preferably subjected to a presulfiding operation designed to incorporate in the catalytic composite from about 0.05 to about 5 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50° F. to about 1100° F. or more.

The conditions utilized in the numerous hydrocarbon conversion embodiments of the present invention are those customarily used in the art for the particular reaction, or combination of reactions, that is to be effected. The catalyst of the present invention is suitable for hydrocarbon conversion processes which may include alkylaromatic isomerization, paraffin isomerization, olefin isomerization, alkylation, denitrification, desulfurization, hydrogenation and hydrocracking.

The following example is given to illustrate further the preparation of the catalytic composite of the present invention and the use thereof in the conversion of hydrocarbons. The example is not to be construed as an undue limitation on the generally broad scope of the invention as set out in the appended claims and is therefore intended to be illustrative rather than restrictive.

EXAMPLE

A reference catalyst was prepared by impregnating a batch of 1/16 inch diameter spherical support material which contained 50 weight percent alumina and 50 weight percent silica with an aqueous impregnating solution containing nickel nitrate and ammonium metatungstate. The concentration of the metal salts was selected to provide a finished catalyst containing 4 weight percent nickel and 14 weight percent tungsten. After impregnation, the catalyst was dried for one hour at 225° F. and calcined for one hour at 1100° F. This reference catalyst was arbitrarily assigned a relative activity of 100. A first portion of the hereinabove described reference catalyst was contacted with a hydrofluoric acid solution to provide 3 weight percent fluoride on the finished catalyst, dried for one hour at 225° F. and calcined at a temperature of 1100° F. for two hours with a nitrogen flow across the catalyst at a gas hourly space velocity of 150. This catalyst was designated Catalyst A. A second portion of the hereinabove described reference catalyst was contacted with a hydrofluoric acid solution to provide 3 weight percent fluoride on the finished catalyst, dried for one hour at 225° F. and calcined at a temperature of 1100° F. for two hours with a nitrogen flow across the catalyst at a gas hourly space velocity of 740. This catalyst was prepared in accordance with the present invention and was designated Catalyst B.

A portion of each of the three hereinabove described catalysts, viz., reference catalyst, Catalyst A and Catalyst B was subjected to an evaluation test in a small scale pilot plant which test consists of charging a vacuum gas oil having the properties shown in Table I to a hydrocracking catalytic reaction zone containing each catalyst in turn at conditions including a liquid hourly space velocity of 1.0, a hydrogen circulation rate of 11,400 standard cubic feet per barrel, a pressure of 2000 psig and a catalyst inlet temperature of 735° F.

TABLE I

| Properties of Vacuum Gas Oil | |
|---|---|
| API° Gravity at 60° F. | 21.6 |
| Distillation | |
| IBP, °F. | 441 |
| 10%, °F. | 619 |
| 50%, °F. | 758 |
| 90%, °F. | 886 |
| 95%, °F. | 921 |
| EP, °F. | 959 |
| Total Sulfur, weight percent | 3 |
| Total Nitrogen, weight percent | 0.1 |

These tests disclosed that with the reference catalyst assigned a relative activity of 100 for comparison purposes, the relative activity of Catalyst A and Catalyst B was 140 and 172, respectively. The experimental results are summarized in Table II.

TABLE II

| Catalyst | Summary of Results | | |
|---|---|---|---|
| | Fluoride Component, wt. % | GHSV | Relative Activity |
| Reference | 0 | — | 100 |
| Catalyst A | 3 | 150 | 140 |
| Catalyst B | 3 | 740 | 172 |

This summary clearly demonstrates surprising and unexpected results caused by the critical amount of flowing gas present during the calcination of the catalytic composite comprising a refractory inorganic oxide, a Group VIB metal component, a Group VIII metal component and a fluoride component. Although the prior art in U.S. Pat. No. 3,963,601 (Hilfman) teaches the incorporation of a fluoride component in a catalyst, this patent does not disclose, demonstrate or teach any improvement in hydrocarbon conversion activity of the catalyst caused by the teachings of the present invention.

The foregoing description and example clearly illustrate the improvements encompassed by the present invention and benefits to be afforded with the use of the catalyst of the present invention

We claim as our invention:

1. A catalytic composite comprising a refractory inorganic oxide, a Group VIB metal component, a Group VIII metal component and a fluoride component prepared by: (1) compositing on a refractory inorganic oxide selected from the group consisting of alumina, silica and mixtures thereof, a Group VIB metal component in an amount of from about 0.01 percent to about 20 percent by weight, a Group VIII metal component in an amount of from about 0.01 to about 10 percent by weight when said metal component of Group VIII is an iron-group metal or from about 0.01 to about 5 percent by weight when said metal component of Group VIII is a platinum group metal and a fluorine component; (2) drying said composite at a temperature of from about 200° F. to about 600° F.; and (3) calcining said composite in contact with a gas consisting essentially of nitrogen at a temperature of from about 700° F. to about 1400° F. and a GHSV of greater than 150 to increase the relative activity of said catalyst.

2. The catalytic composite of claim 1 wherein said Group VIB metal component comprises molybdenum or tungsten.

3. The catalytic composite of claim 1 wherein said Group VIII metal component comprises nickel or cobalt.

4. A method of preparing a catalytic composite which comprises:
   (a) compositing on a refractory inorganic oxide selected from the group consisting of alumina, silica and mixtures thereof from about 0.01 percent to about 20 percent by weight of a Group VIB metal component and from about 0.01 to about 10.0 percent by weight of an iron-group Group VIII metal component or from about 0.01 to about 5 percent by weight of a platinum group Group VIII metal component;
   (b) drying said composite at a temperature of from about 200° F. to about 600° F.;
   (c) calcining said dried composite at a temperature of from about 700° F. to about 1400° F.;
   (d) introducing into said composite a fluoride component;
   (e) drying said component at a temperature of from about 200° F. to about 600° F.; and
   (f) calcining said dried component with fluorine added thereto in contact with a gas consisting essentially of nitrogen at a temperature of from about 700° F. to about 1400° F. and a GHSV of greater than 150 to increase the catalytic composite's activity.

5. The method of claim 4 wherein said Group VIB metal component comprises molybdenum or tungsten.

6. The method of claim 4 wherein said Group VIII metal component comprises nickel or cobalt.

* * * * *